May 21, 1957 G. A. ROE 2,792,938
NUT SORTING MACHINE
Filed March 8, 1952 7 Sheets-Sheet 1

Fig. 1.

INVENTOR.
George A. Roe.
BY Christy, Parmelee and Strickland
ATTORNEYS.

May 21, 1957 G. A. ROE 2,792,938
NUT SORTING MACHINE
Filed March 8, 1952 7 Sheets-Sheet 2

Fig. 2.

INVENTOR.
George A. Roe.
BY
Christy, Parmelee and Strickland.
ATTORNEYS.

INVENTOR.
George A. Roe.

May 21, 1957  G. A. ROE  2,792,938
NUT SORTING MACHINE
Filed March 8, 1952  7 Sheets-Sheet 5

INVENTOR.
George A. Roe.
BY
Christy, Parmelee and Strickland
ATTORNEYS:-

May 21, 1957 G. A. ROE 2,792,938
NUT SORTING MACHINE
Filed March 8, 1952 7 Sheets-Sheet 6

INVENTOR.
George A. Roe.
BY
Christy, Parmelee & Strickland
ATTORNEYS

United States Patent Office 2,792,938
Patented May 21, 1957

2,792,938

NUT SORTING MACHINE

George A. Roe, Gary, Ind.

Application March 8, 1952, Serial No. 275,485

12 Claims. (Cl. 209—88)

This invention relates to a nut sorting machine. More particularly, the invention relates to a machine for gauging the width, length, thickness and the position and size of the thread-receiving hole of nut blanks.

Threaded nuts are now being manufactured with automatic machines which operate at a comparatively high rate of speed, and turn out threaded nuts at a rapid rate. It is important to inspect the nut blanks before they are sent to the threading machine in order to have properly shaped nuts for threading, and in many cases it is best to sort the nuts after being threaded in order to separate defective nuts.

It is well known that nut blanks may be made by many different methods, and all of these methods form imperfect blanks, in that they are too wide or too narrow, or too thick. The blanks may be too thin, and may not have the proper shape, such as squares and hexagons. In many nuts, the hole is not properly centered, or it is too small to receive the threading tap, or it may not be round, in order to receive a perfect thread.

If imperfect nuts are sent to the threading machine, the operation may be interfered with, the tap may be broken, or the machine clogged to the point where it is necessary to shut down and repair any damaged parts.

Also the presence of a few imperfect nuts in a keg of finished nuts may be the cause for the rejection of the entire keg of finished nuts.

The complete inspection of a nut involves the measurement of the length, width, thickness, and the position and character of the thread-receiving hole. These measurements cannot properly be made without measuring instruments, and it is very difficult to make the measurement by hand. The finished nut is an inexpensive product, so that a manual inspection is no practicable. Further, with the present invention, all of the necessary measurements may be positively and rapidly made, and the imperfect blanks may be eliminated, as well as half nuts, crop ends, and scraps.

The primary object of the present invention is to provide a machine which will rapidly and accurately inspect the many dimensions of a nut blank to determine whether the dimensions are in accordance with specifications adopted for making satisfactory nuts.

A further object of the invention is to provide a machine which will rapidly and accurately inspect the dimensions of the nut and classify the inspected nuts to those of approved dimensions, and reject the imperfect nuts.

Another object of the invention is to provide a machine to inspect nut blanks to determine the position of the thread-receiving hole, the shape and the size of the hole, and to reject those blanks in which the thread-receiving hole does not meet the proper specifications.

A still further object of the invention is to provide a machine which is simple in construction and operation, and rapidly inspects each individual nut while collecting the blanks of proper dimensions in one group, and collecting the reject blanks in another group.

With these and other objects in view, the invention consists in the improved nut inspecting and sorting machine illustrated and hereinafter described and particularly defined in the appended claims.

The various features of the invention are illustrated in the acompanying drawings, in which:

Figs. 5 and 6 are plan views showing the parts of the inspecting machine on the level at which nut blanks are fed into the machine, Fig. 5 showing the width and length measuring parts withdrawn from the inspection station, while Fig. 6 shows these parts in measuring position;

The machine of the present invention makes measurements of the length of a nut, whether too long or too short; the width of a nut, whether over or under width; the thickness of a nut, whether too thick or too thin, and the condition of the thread hole as to size, location and shape. After these measurements have been made, the nut is removed or ejected from the machine and sent to an approved dimension receiver or a reject receiver.

The operating cycle of the machine consists in feeding the nuts to an inspection measuring station, measuring the nut, positioning the nut in accordance with measurements to go into an approved or reject receiver, ejecting the nut, and returning the parts to the starting position.

*Nut feed*

Figure 1:
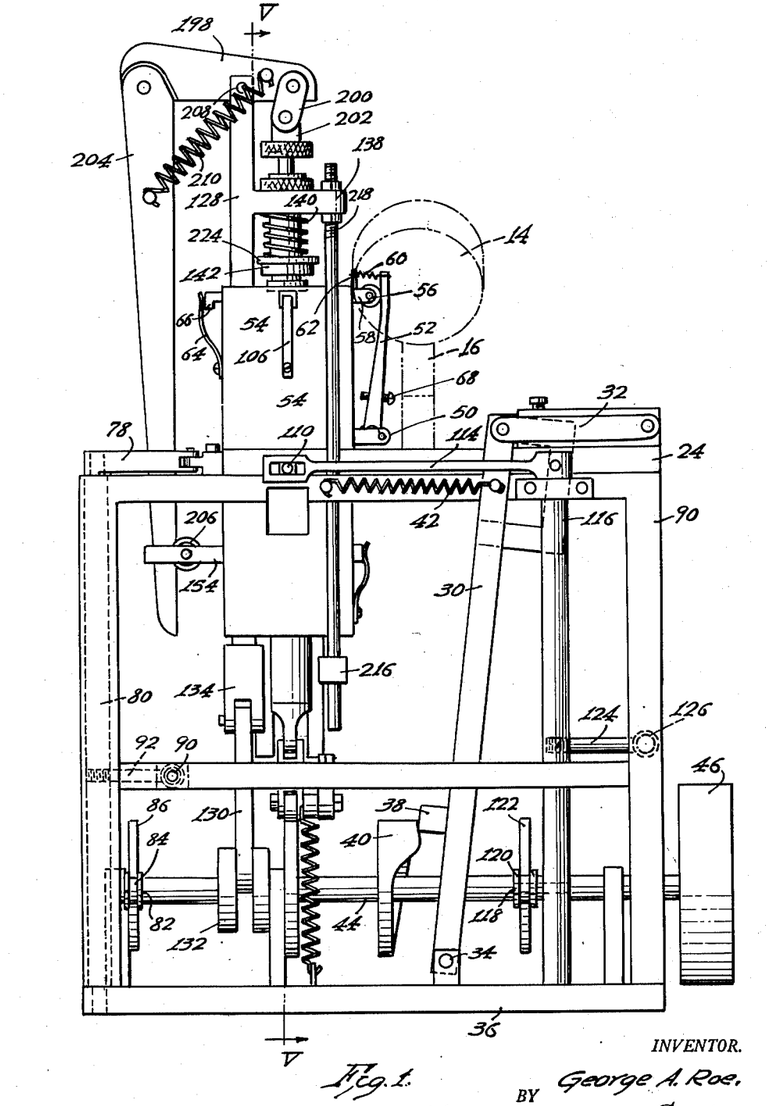
Fig. 1 is a view in side elevation of the improved nut blank inspecting machine embodying the preferred form of the invention.
Figure 2:
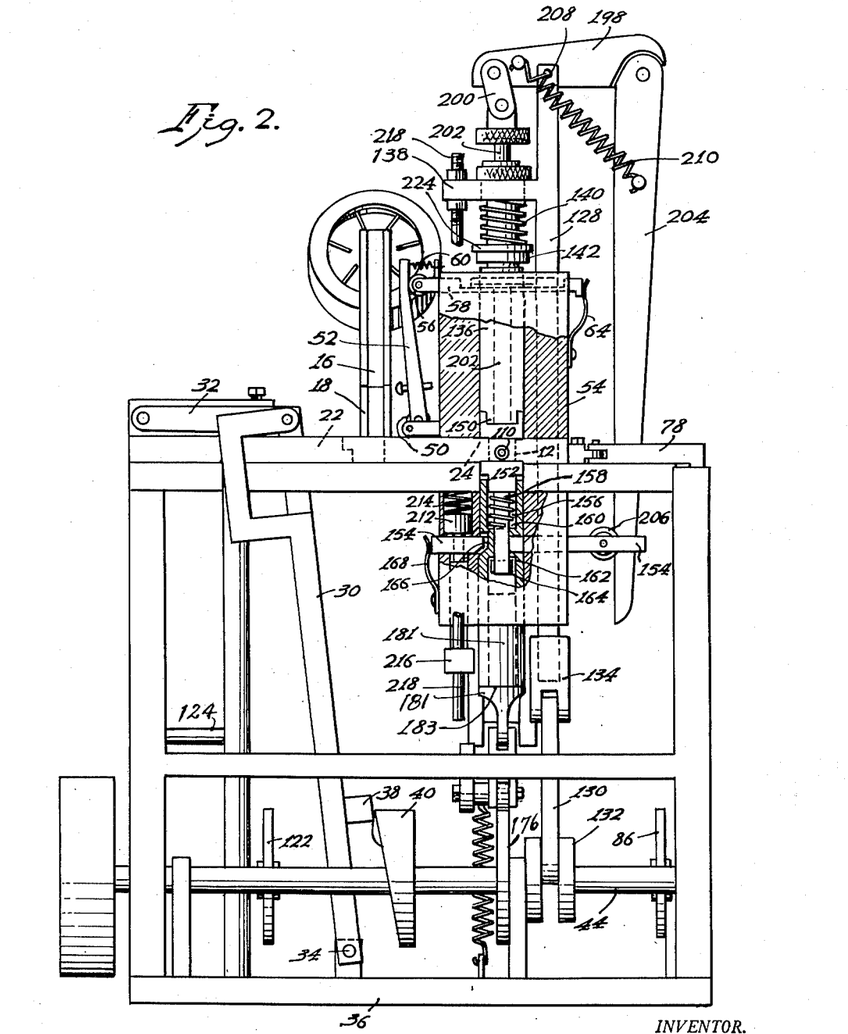
Fig. 2 is a view in side elevation with parts shown in section taken on the opposite sides of the machine than the view shown in Fig. 1.

The nuts, which are preferably the blanks before they have been threaded, are fed to an inspection station 12 (Fig. 6), which is a rectangular station for receiving a square nut. The nuts are first aligned in a hopper 14 (Figs. 1 and 3), and pass down through an inclined chute 16 to a vertical chute 18. From the chute 18 the nuts fall into a nut track 20 (Figs. 3, 5 and 6) and are moved forwardly by a feeder 22 which has a reciprocating motion between rails 24, which form the nut track. The feeder 22 is held in the nut track by means of plates 26, and has outwardly-extending arms 28 (Figs. 6 and 7) that are connected with oscillating arms 30 by means of links 32 (Figs. 1, 2 and 6). The arms 30 are pivoted at 34 (Figs. 1 and 2) in the base 36 of the machine frame, and have a cam block 38 connected between them which is positioned to engage a face cam 40. Cam block 38 is held in contact with the face of the cam 40 by means of a spring 42. The feeder makes a complete reciprocating movement with each complete rotation of the cam shaft 44 which is driven from a pulley 46 (Fig. 1), or may be directly connected with a motor.

When a nut is placed against the inspection station 12, it makes a yielding measuring engagement with the nut, due to the spring 42, and the position of the leading face of the feeder determines the length of the nut.

Length measurement

Figure 6:
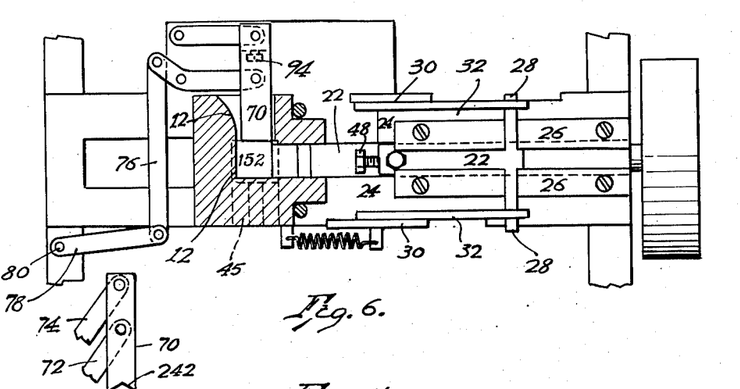
Figure 7:
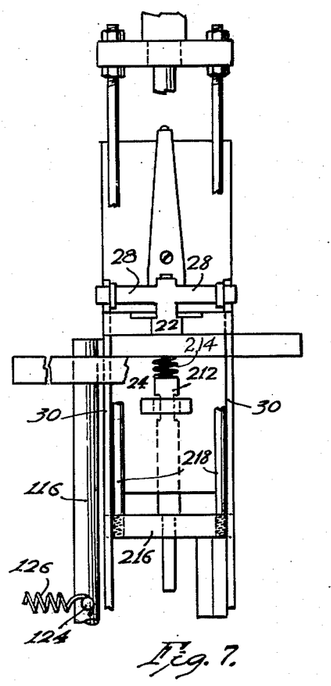
Fig. 7 is a detail view in rear elevation showing the locking latch for the table locking slide and its operating mechanism.

When the feeder advances the nut to the inspection station, a contact bolt 48 (Fig. 6) mounted in the front end of the feeder 22, contacts a gauge roller 50 secured to a gauge arm 52 (Figs. 1, 2 and 7). The gauge arm 52 is pivotally mounted on the back side of the machine head 54, the pivot being located below the pivotal mounting of the roller 50, as shown similarly in Fig. 8. The gauge arm 52 engages a roller 56 mounted in the rear end of a slide 58 (Figs. 1, 2 and 9), which is slidably mounted in the upper portion of the head 54. A spring 60 is connected between the upper end of the arm 52, and a pin 62 extending upwardly from the slide 58, the spring 60 acting to hold the arm 52 against the roller 56. Slide 58 extends across the head 54 and is engaged by means of a leaf spring 64, which tends to hold the slide pressed against the arm 52. A downwardly-projecting stop 66 on the slide 58 is arranged to engage the block 54 to determine one position of the slide on the block. As illustrated in Fig. 1, the slide 58 is in neutral position, indicating a proper length movement. If the slide is held by the spring 64 to the right of the position shown in Fig. 1, the setting of the slide by the feeder 22 indicates that the nut is too long. If the slide is moved by the feeder 22 further to the left than the position shown in Fig. 1, then the length measurement shows that the nut is too short. To prevent the arm 52 from being moved too far by the feeder 22, a stop screw 68 is mounted in the arm in a position to engage the head 54, and any further movement of the feeder cam 40 will be provided for by elongation of the spring 42.

Width measurement

Figure 8:
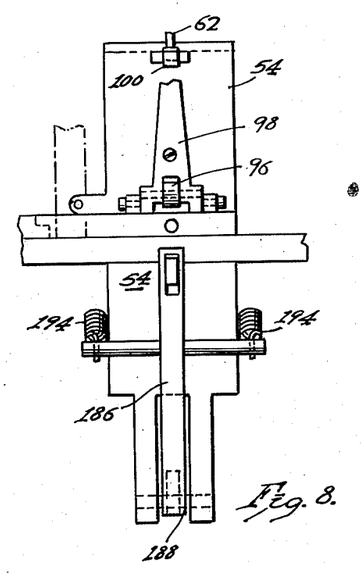
Fig. 8 is a view in side elevation showing the ejector for the defective or rejected blanks and the mechanism for operating the width inspection slide.

At the time that the nut is being fed to the inspection station, a width feeler is moved to a position to contact the nut upon a face at right angles to the line of advance of the nut into the inspection station. The width feeler is shown more partciularly in Figs. 5 and 6. This feeler 70 is supported by parallel links 72 and 74 at the side of the machine head 54. The link 72 is connected by means of link 76 with an arm 78 secured to the upper end of a rotary shaft 80 (Figs. 1 and 4). The shaft 80 has an axle 82 secured thereto on which is mounted a cam follower 84 arranged to engage a cam 86 mounted upon and rotatable with the shaft 44. A spring 88 is connected between a post 90 of the machine frame (Figs. 1 and 4) and a pin 92 mounted in the shaft 80. The spring acts to hold the cam follower 84 in contact with the face of the cam. The surface of the cam is effective in moving the measuring feeler 70 from the position shown in Fig. 5 to the position shown in Fig. 6, to cause the feeler to yieldingly engage a nut which has been moved into the inspection station by the feeder 22. When the feeler 70 is moved into nut engaging position, a stop 94 (Fig. 3) on the feeler engages a roller 96 on a gauge arm 98 (Fig. 8). The gauge arm 98 has the same shape and type of mounting on the machine head 54 that the gauge arm 52 has. The upper end of the arm 98 engages a roller 100 mounted in a slide 102 (Fig. 4). The arm 98 is held in engagement with the roller 100 by means of a spring 104 (Figs. 3 and 4) connected between the upper end of the arm and a pin in the slide 102. The slide extends across the top of the head and is engaged by a leaf spring 106 which acts to hold the slide roller 100 against the arm 98. The slide 102 as illustrated in Fig. 4, is in neutral position, indicating the proper width measurement of the nut, and when a stop 108 on the slide engages the head 54, or is closer to the head 54 than the position illustrated in Fig. 4, the width measurement shows that the nut measured is too wide. If the stop 94 moves the arm 98 to force the slide to the right (viewing Fig. 4), then the width measurement will indicate that a nut being measured is too narrow. When the slide is in neutral position, the measurement feelers indicate dimensions within the specifications, and if the slide is either to the right or to the left of the neutral position, then the measurement indicates an imperfect nut, and at such time the nut will be rejected.

Ejection of approved nut

An approved nut ejector 110 (Figs. 1, 3 and 5) is mounted in the head 54 at the position of the inspection station 12 (Fig. 6). The ejector consists of a round pin (Fig. 2) which moves across the inspection station and ejects the nut into an approved nut receiver 112 (Fig. 3), said receiver being illustrated as an inclined chute which may conduct the nuts to a desired type of receptacle. The ejector 110 is pivotally mounted in the outer end of an arm 114, which is connected to the upper end of a rotatably mounted shaft 116 (Fig. 1). The shaft 116 is mounted in front of the cam shaft 44, and has a pin 118 on which a cam follower 120 is rotatably mounted in position to engage the peripheral edge of a cam 122 mounted on shaft 44. An outwardly-extending arm 124 in the shaft 116 is connected by means of a spring 126 (Figs. 1 and 7) with the machine frame. The spring 126 holds the cam follower in contact with the cam, so that the ejector 110 continues to have a reciprocating movement as long as the shaft 44 is rotated. Anything in the form of a nut which is on the inspection station at the time that the ejector is reciprocated, will be removed from the station and the ejector will make an ejecting movement for each feeding movement of the feeder 22.

Feeler operation

Figures 9, 10:
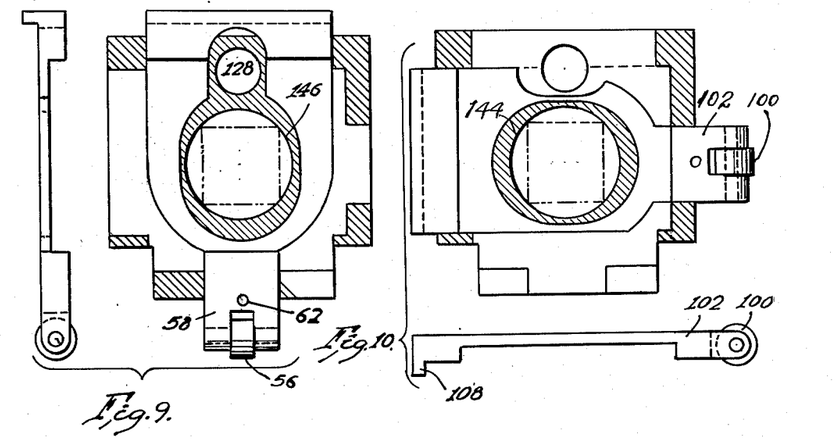
Fig. 9 is a plan view with parts shown in section, showing the length inspecting slide and its mounting in the machine head.
Fig. 10 is a plan view with parts shown in section, showing the width inspection slide and its mounting in the machine head.

The thickness feeler and the hole inspection feeler are mounted for movement with a vertical shaft 128 (Figs. 1, 2, 3 and 4). The shaft is slidably mounted in the machine head 54, and is given a vertical reciprocating movement by means of a crank arm 130 connected with a crank 132 of shaft 44. The crank arm 130 is connected to a block 134 secured to the lower end of the shaft 128, so that when the crank 132 is given a rotation, the shaft makes a reciprocation for each rotation of the shaft 44. A height feeler 136 is slidably mounted in the head 54 (Fig. 2), and is slidably mounted in an outwardly-projecting arm 138 connected with the shaft 128. The slide 136 is held for movement in unison with the shaft 128 by means of a spring 140 and nut 142, which causes the slide 136 to move with the shaft 128 until the nut 142 engages feeler slides in the head 54. Thereafter the spring 140 will yield and allow the shaft 128 to reciprocate without giving further movement to the slide 136. The slide 136 also moves through circular openings 146 in slide 58, and 144 in slide 102 (Figs. 9 and 10). If the slides 58 and 102 are in neutral or central position, the nut 142 will move downwardly through the slides, which in turn will indicate that the slides are set in position for the proper width and length specifications. At that time, the bottom 150 of the slide 136 will lightly engage the top of the nut at the inspection station. If the nut is too thick, then the slide 136 will be stopped in its downward movement, and further movement of the shaft 128 will act to set the reject equipment into operation as hereinafter described. The feeler shaft 128 is reciprocated continuously by the cam shaft 44, and makes a complete reciprocation irrespective of the position of the height feeler.

Height measurement

When the nut blank is moved into the inspection station 12, it is supported upon a table 152 (Fig. 2) which has its upper surface in the plane of the feed track 20. Therefore, when the height feeler moves down to engage a nut on the table, the measurement is made with reference to the top of the table. The table is normally supported in inspection position by means of a cam 176, its elevation being determined by means of its position against rails 24 (Fig. 2). A spring 156 surrounds a stem 158 extending downwardly from the table, the spring being compressed between the table 152 and the bottom of cavity 160 in a table slide 162. A nut 164 is connected to the bottom of the stem 158 by which the elevation of the table may be varied. The table slide 162 has a notch 166 (Fig. 2) therein, which is arranged to receive the lock slide 154 when the table is in elevated position, the lock slide being held in the slot by means of a leaf spring 168 attached to the head 54 and bearing against the end of slide 154. A spring 170 (Fig. 3) normally tends to move the table slide 162 downwardly, the spring being mounted between the bottom of the head 54 and an outwardly-extending arm 172 on the slide 162. When the spring 170 moves the tables downwardly, cam roller 174 engages the peripheral face of a cam 176 mounted on the cam shaft 44, the roll 174 being mounted on an arm 178, which is pivotally connected to the the machine frame 90, and is connected by means of a link 180 to a slide 181 (Fig. 2) which is movable in a cavity within the slide 162. A spring 182 holds the roll 174 in contact with the face of the cam so that the normal action of the cam 176 is to give a reciprocating motion to the slide 181. If the spring 170 holds the slide 162 in engagement with a shoulder 183 on the slide 181, then the slide 162 and table 152 will be reciprocated by the cam 176.

When the table is locked in its upward position to support a nut of approved dimensions, as illustrated in Fig. 2, the cam 176 tends to reciprocate the slide 181 within the slide 162, so that the table is not affected. At the time that the table slide is released from the lock slide 154, then the springs 170 and 182 hold the roll 174 in contact with the cam 176 and the slide then is moved by the cam. When the table moves into the lower position, as indicated by the low spot on the cam, normally a defective nut is in position upon the table, and as the table moves downwardly, an ejector is set into operation to eject the nut from the table to place it in a rejected nut receiver.

Rejected nut ejector

The rejected nut ejector 184 (Fig. 3) consists of a pin which is slidably mounted in the head 54. The pin is pivotally connected with an arm 186 which is pivoted to the bottom of the head 54 at 188. As the table slide 162 moves downwardly, a cam 190 on the slide moves across the face of a cam 192 secured to the lower end of the arm 186. When the cam 190 reaches the bottom of the cam 192, springs 194 (Fig. 8) quickly move the arm 186 to move the pin across the face of the table to eject the nut into a reject nut receiver 196, it being understood that the cam 176 is timed so that the cam 190 will release the arm 186 after the table has moved below the position at which the pin will move across the top of the table.

Table lock release

The shaft 128 is connected at its upper end to a lever 198 and moves the lever up and down during its reciprocation. The lever 198 is connected by means of links 200 to the upper end of a nut screw hole feeler 202. The other end of the lever 198 is pivotally connected with a downwardly-extending lever 204 which engages a roll 206 mounted in the outer end of the table lock slide 154 (Figs. 1 and 2). If the height feeler 136 does not meet any resistance during its downward stroke, it will carry the lever 204 downwardly in a position substantially parallel to the axis of the shaft 128, and there is no tendency for the lever 204 to move the slide 154 into table releasing position. If, however, the feelers 136 and 202 are stopped in their downward movement by a defective nut being measured, the downward movement of the shaft 128 will oscillate the lever 198 about a pivot 208 for the lever 198, and this oscillating movement, due to springs 210 connecting lever 198 with lever 204, will force the lower end of the lever 204 against the roll 206 to move the slide 154 into unlocking position. When the slide moves into unlocking position, a latch 212 (Figs. 2 and 7) slidably mounted in the head 54, will be forced down into an opening in the slide 154 by a spring 214 to hold the slide in an unlocking position. The latch 212 projects downwardly below the head 54 and extends through a block 216 mounted on rods 218 which extend upwardly past the machine head and are connected with the arm 138 which is integral with the shaft 128. The rods, together with the block 216, have a regular reciprocating motion which is imparted to them by the shaft 128. The latch 212 passes through the block 216 and has a shoulder above the block such that when the block is lifted by the upward movement of the rods 218, the latch will be moved upwardly out of the slide 154 to release it so that the spring 168 will move the slide into locking position when the table 152 is raised by the cam 176. With this construction the table locking slide is locked in released position to permit the table to move downwardly when a defective nut is on the table, and the slide will be locked in this position until the shaft 128 is nearing the end of its reciprocating motion, when the latch 212 will release a slide to permit the table to be again locked in its uppermost position. The table will be unlocked, ready to be moved downwardly at any time that the nut 142 on slide 136 is stopped in its downward movement by one of the inspection slides 58 or 102, or an inspection slide for the measurement of the thickness of the nut as will be hereinafter described. If the nut has the proper thickness, the lower end 150 of the slide 136 will move down to contact the nut with a slight pressure, and at this time the nut 142 will move through the inspection slides, and its downward movement will be stopped. At this time the nut thread inspection feeler 202 will continue to be moved downwardly through the slide 136 to contact the nut thread hole. If the nut thread hole is not properly positioned in the nut, or is not the right size or shape, the lower end of the feeler 202 will engage the nut and stop the further downward movement of the feeler. At this time the lever 198 will be rotated about its axis 208 to move the lower end of the lever 204 inwardly to move the table locking slide 154 into releasing position. The latch 212 will lock the slide into releasing position, and the continued movement of the cam 176 will move the table down for ejection of the defective nut by the ejector 184.

Rejection of a thin nut

When the inspection slide 136 is moved downwardly to inspect nuts, the inspection nut 142 passes through openings 146 and 144 in slides 58 and 102 respectively, and may also pass through a circular opening 220 in a slide 222 which is mounted to move over slide 102 in the top of the head 54. If the nut is of approved thickness or too thick, the face 150 on the slide 136 will engage the nut and stop its further downward movement before a flange 224 on nut 142 enters the opening 220, and spring 140 will be compressed. If the nut is too thin, the flange 224 on nut 142 will pass into the opening 220 in slide 222 to hold the slide 222 in fixed position in the head 54. The slide 222 has a roller 228 on its outer end, which rides in a slot 230 of a cam lever 232 (Figs. 1 and 13) that is pivoted in the lever 204. If the nut is too thin, the downward inspection movement of shaft 128 will bring the roller 228 into engagement with an offset portion 234 of the cam slot. Since the roller 228 has been fixed in position by the flange 224 engaging the wall of opening 220, the lever 204 will be moved inwardly to move the table slide 154 to cause the table to be lowered into position for rejecting the thin nut. The cam lever 232 is mounted to yield under a spring 236 when being moved by roller 228.

With the construction outlined above, it will be seen that the first part of the downward movement of the feeler operating shaft 128 will seat the length and width inspection slides into rejecting position if the feeder 22 or feeler 70 detect defective nuts. The further downward movement of the shaft 128 will bring the feeler slide 136 into contact with the nut to detect its thickness. Thereafter the thread hole feeler 202 will be brought into contact with the nut to inspect the condition of the thread hole. If the nut is so thin that the lower end 150 of the slide 136 does not engage the nut at the point of minimum thickness, a slight downward movement thereafter will place the flange 224 of the inspection nut 142 within the opening 220 of the slide 222. When the portion 150 of the slide 136 engages a nut of approved thickness, or a nut which is too thick, the inspection nut 142 will not have moved down far enough for flange 224 to engage the face of the opening 220, so that the slide 222 is free to slide in the head 54, and the continued downward vertical movement of the lever 204 will not be affected by the movement of the roller 228 in the cam slot 234 because the slide 222 will be moved as roller 228 enters cam slot 234. With the flange 224 in the opening 220, the slide 222 will be fixed in the head 54, and then a downward movement of the cam slot 230—234 across the roller 228 will move the lever 204 against the slide 154 to cause the table to be moved into nut-rejecting position.

To recapitulate, the feeder 22 and feeler 70 will first set inspection slides in position to interrupt the simultaneous downward movement of the feeler slide nut 142, with the shaft 128, if the nut is defective. The feeler 202 does not set an inspection slide, but if its downward movement is interrupted by a nut with an off-center hole, a hole that is too small, or out of round in shape, or a hole which is not vertical, it will cause the table release to be operated, and the rejection of the nut will result. The downward movement of the feeler slide 136 does not set an inspection slide, but this downward movement will cause the table release to be operated if the lower end 150 engages a nut which is too thick or too thin. All of the inspection operations of the feelers and the slide 136 and cam 230—234 are yielding in their operation, in that they are spring-pressed, so that if their normal operation is discontinued by defective dimensions of the nut, the shaft 128 may continue its normal cycle of operations without placing strain on the parts. All of the measurements are made in a sequence, such that the table will be moved from normal inspection position to rejecting position before the ejectors are put into operation to remove nuts from the table.

With the above machine, the nut inspection measurements are made accurately and rapidly, so that the machine may be run at a speed such that from sixty to eighty nuts per minute may be inspected and sorted.

Figure 3:
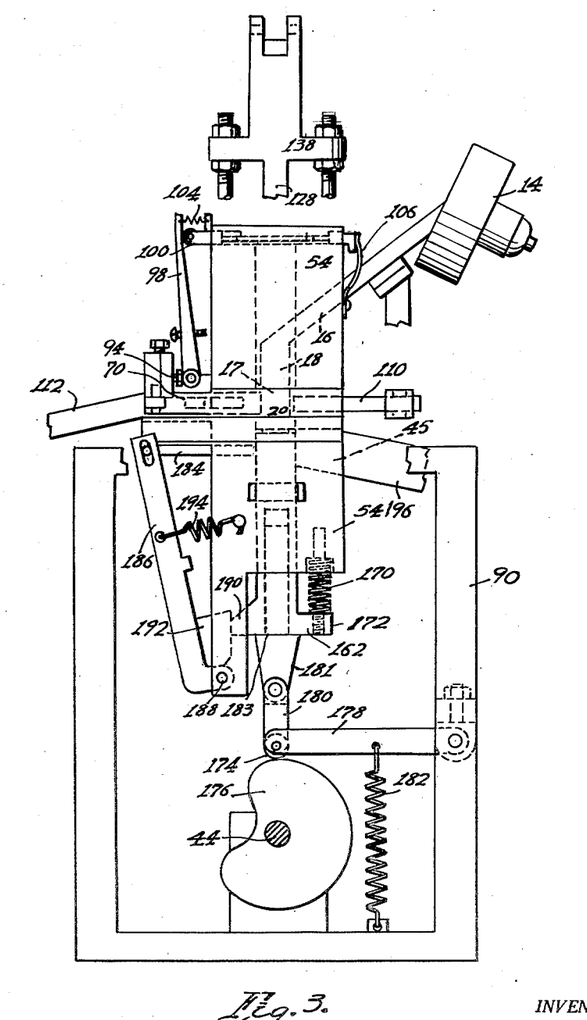
Fig. 3 is a view in front elevation of the machine shown in Fig. 1, with parts being broken away to show the inspection measuring parts.
Figure 4:
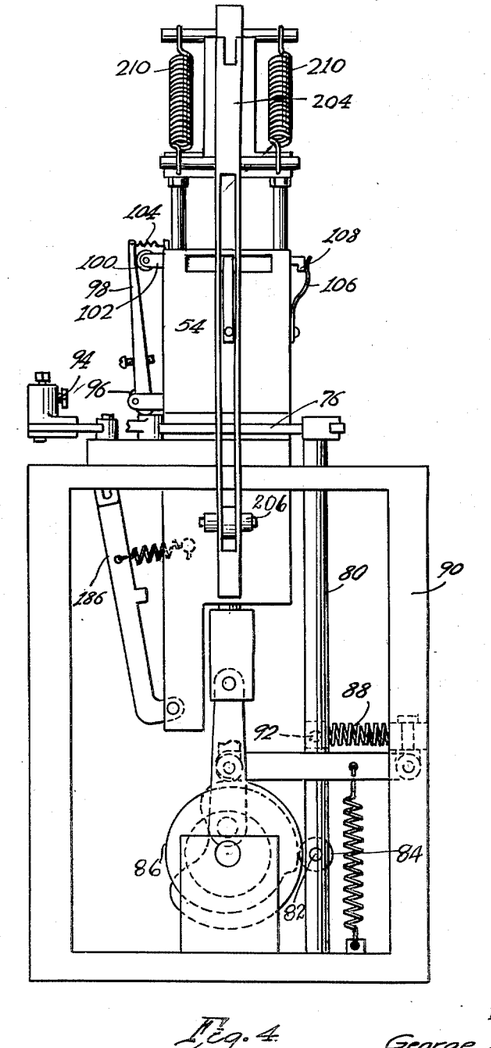
Fig. 4 is a view in front elevation of the improved nut blank inspecting machine.
Figure 5:
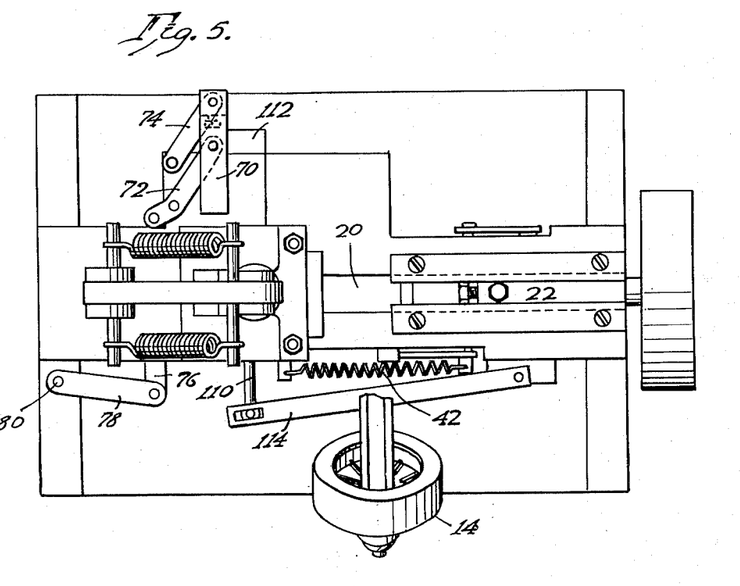
Figures 12, 13, 14:
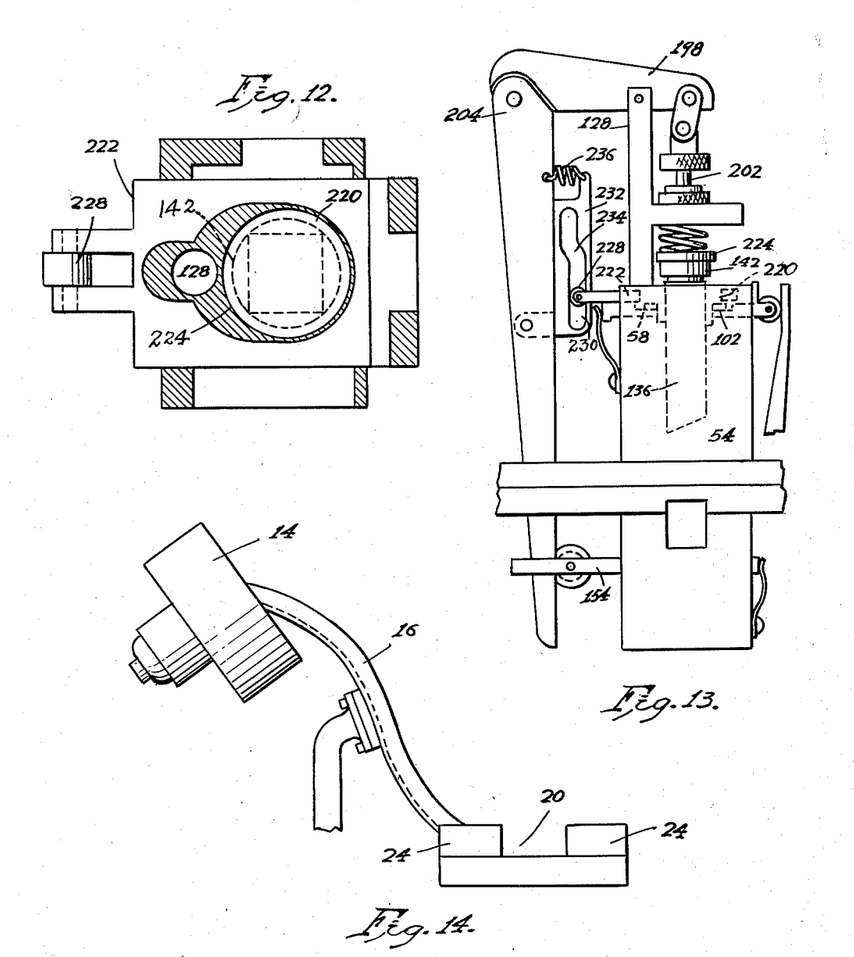
Fig. 12 is a plan view with parts shown in section, showing the height inspection slide and its mounting in the machine head.
Fig. 13 is a detail view in elevation showing the mechanism for inspection of thin nuts.
Fig. 14 is a side view of an alternative mounting of the feed aligning hopper.

In Figs. 3 and 5 the well-known type of nut aligner 14 is shown at the left side of the feed track 20. This aligner is used with an inclined chute 16 and a vertical chute 18, to feed the nuts one at a time into the feed track. In Fig. 14 the nut aligner 14 is shown in its preferred form to be mounted at the right side of the track, viewing Fig. 3. The aligner of Fig. 14 uses only an inclined chute 16 to deliver nuts directly to the feed track 20 through an opening in the side of a rail 24.

Figure 11:
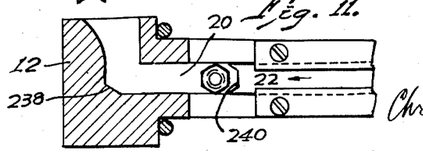
Fig. 11 is a detail view showing the shape of the feeder and inspection station for measuring hexagonal nuts.

In Fig. 11 is illustrated the shape of the inspection station 12, the feeder 22, the feeler 70, for operating on hexogonal nuts. The inspection table has a V notch 238 to receive a V-shaped portion of a hexagonal nut, and the feeder 22 has a depressed face 240 to engage substantially one-half of the peripheral face of the nut. The feeler 70 has a V-shaped notch 242 to engage a V-shaped portion on the nut to move the nut into the V-shaped notch 238 for inspection.

It will be understood that different sizes of square and hexagonal nuts may be measured and sorted with the machine illustrated in the drawings, by changing the size of the nut track 20 and the face of the pusher 22 and feeler 70, as well as the inspection station 12, to accommodate different sizes and shapes of nuts.

In the claims the words "nut blank" are used to refer to the metal nut either before or after the central hole has a thread placed therein. In some cases the product passing through the threading machine needs to be inspected. However, it is important to inspect the nuts before they are fed into the threading machine to make a good product and at the same time protect the machine.

The preferred form of the invention having thus been described, what is claimed as new is:

1. A nut blank inspecting and sorting machine comprising an inspection station having fixed faces against which a nut blank is positioned to be measured, a feeder feeler for advancing blanks to one face of the station to measure the length of the blank, a separate feeler movably mounted to press the nut blank against another of said fixed faces, and an ejector mechanism movable to place the nut blank in an approved receiver if the length and width measurements are approved by the feeder and feeler, said ejector movement being controlled by the measuring movement of said feeder and feeler and operating means for the feeder, feeler and ejector.

2. The nut blank inspection machine defined in claim 1 in which the nut blank is deposited in a reject receiver by a repect ejector controlled by the measurement movement of the width feeder and length feeler when the feeder or feeler detect a defective nut, and means for actuating the reject ejector.

3. A nut blank inspecting and sorting machine as defined in claim 1 in which a blank thickness feeler is movable toward the inspection station simultaneously with the feeding of a blank to the station and arranged to determine the blank thickness in sequence after the width and length are determined, said thickness feeler mechanism being connected with the ejector to arrange ejection of a blank into an approved receiver only when the blank has an approved thickness.

4. A nut blank inspecting machine defined in claim 1 in which a table is movably mounted in the inspection station for supporting blanks while the blanks are being measured with reference to the fixed faces at the station, said table being movable to support blanks in reject ejecting position, a reject ejector is arranged to move over the table while in ejecting position, means operable by the feelers to move the table in position for the reject ejector to place the the nut blank in a reject receiver when the blank measurements show the blank to be defective, and means for operating the reject ejector.

5. A nut blank inspecting and sorting machine comprising an inspection station, a table for supporting a nut blank at the station, a feeder feeler for placing blanks in the station on a table, a thickness feeler movable toward and from the table to contact the upper face of a blank when on the table, said table having connections with the feelers for presenting the blank into positions for ejection into an approved blank receiver, or into a blank rejection receiver, ejectors movably mounted to pass over the table at both of said ejecting positions to remove the nut blank from the table after it has been measured, and driving means for the feelers, table mover and ejectors.

6. The machine defined in claim 5 in which a hole feeler shaped to inspect the thread-receiving hole in the blank is movable with the blank upper face feeler, means operable by the hole feeler to position the table in accordance with the size, position, or shape of the hole for ejection of the blank into an approved or reject receiver.

7. A nut blank inspecting and sorting machine comprising an inspection station, a table for supporting a nut blank at the station, a feeder for placing blanks in the station on the table, a thickness feeler movably mounted to move toward and away from the table, means to move the table between the blank measuring position and a blank rejecting position, means for normally locking the table in blank measuring position and slides movable into the path of movement of the thickness feeler to release the table locking means and connect the table to its moving means to place the table into rejecting position when the nut thickness is either greater or less than the desired thickness, and an ejector movable over the table while it is in the measuring position and another ejector movable over the table while it is in rejecting position to eject the measured blank.

8. A nut blank inspecting and sorting machine comprising an inspection station, a movable table for supporting a nut at the station, a feeler feeder operable to place blanks on the table and simultaneously measure the length of the blank, a feeler yieldingly movable into contact with a blank in paths arranged at right angles to the path of the feeder feeler to determine the width of the blank, a thickness feeler movable toward the top of the blank during the measuring movement thereof, slides mounted in the path of movement of the feelers and movably controlled by the feelers in accordance with their measuring movement, said slides being set by the feelers in a neutral position when the feeler measurements show a nut blank is of approved dimensions to permit an unobstructed movement of the feelers, and said slides being set to obstruct the movement of the feelers when the feeler measuring movement shows a defective blank, means controlled by the feeler movement to move the table into a reject receiver position when measurements show a defective blank, ejectors for moving the blank into an approved or reject receiver in accordance with the feeler measurements, and means for operating the feelers, table and ejector.

9. The nut blank inspecting machine defined in claim 8 in which a hole inspecting feeler is movable with the thickness feeler into contact with the top of the nut at the position of the hole therein, and means controlled by the inspection movement of the hole inspecting feeler to set the table for the ejection of the blank into an approved or a reject receiver in accordance with the size or shape or position of the hole in the blank being respectively satisfactory or irregular.

10. The machine defined in claim 9 in which the blank nut is received and supported upon a table at an inspection station, said table being vertically movable by a cam between an upper blank receiving level and a lower blank rejecting level, a slide movably mounted under the table arranged to lock the table at receiving level and to hold the table out of control of the cam when at receiving level, means operable by the feelers to release the table from locking connection with the locking slide, a spring operating mechanism to place the table into operating connection with the cam when the table is lowered for rejecting a nut, and means for continuously rotating the cam.

11. The inspection machine defined in claim 10 in which a latch is mounted over the table slide in position to hold the slide with the table in elevated blank receiving position when the table is raised to receiving position by the cam.

12. The inspection machine defined in claim 10 in which a reject ejector is mounted to move over the table when the table is in reject position, said reject ejector being spring-operated to eject a blank when the table is moved into lowered position, and means to withdraw the ejector from an ejecting position over the table as the cam moves the table into receiving position.

References Cited in the file of this patent

UNITED STATES PATENTS

| | | |
|---|---|---|
| 1,341,278 | Morey | May 25, 1920 |
| 1,411,169 | Ehrman | Mar. 28, 1922 |
| 1,424,370 | Morey | Aug. 1, 1922 |
| 2,407,062 | Darrah | Sept. 3, 1946 |
| 2,556,413 | Boosey et al. | June 12, 1951 |
| 2,578,573 | Mills | Dec. 11, 1951 |
| 2,580,187 | Nichols | Dec. 25, 1951 |